United States Patent Office 2,754,237
Patented July 10, 1956

2,754,237
METHOD OF MAKING COMPOSITE RESIN-GLASS STRUCTURES

Marvin C. Brooks, Packanack Lake, N. J., assignor to United States Rubber Company, New York, N. Y., a corporation of New Jersey No Drawing. Application November 6, 1953,
Serial No. 390,717

9 Claims. (Cl. 154—128)

The present invention relates to a method of producing improved bonding between polyester resins and glass and particularly between polyester resins and glass fibers, this improved bonding being manifested, in the case of composite fiber glass-polyester resin structures, by greatly improved flexural strength.

In my co-pending application Serial No. 343,505, filed March 19, 1953, I have described the admixture of certain silane materials with curable polyester resins to improve the bonding between such resins and glass. The silane materials described in said application consists of the vinylalkoxysilanes and vinyl-2-chloroalkoxysilanes wherein each alkoxy group contains from 2 to 6 carbon atoms, vinylallyloxysilanes, vinylacyloxysilanes wherein the acyloxy group contains from 2 to 6 carbon atoms, and normally liquid products of the reaction of vinylchlorosilanes with saturated aliphatic dihydric alcohols, the said reaction products having been prepared by use of the reactants in such proportions that the ratio of alcoholic hydroxyl groups to chlorine atoms in the initial reaction mixture is greater than unity. The present invention relates to an alternative method whereby improved bonding can be obtained between the glass and the polyester resin with the use of certain silane materials some of which are the same as those described in the said application.

According to the present invention before the glass and the resin are brought together, the surface of the glass is coated with a silane material selected from the group consisting of (1) normally liquid reaction products of vinylchlorosilanes with saturated aliphatic dihydric alcohols, these reaction products being the same as are disclosed in the aforementioned application, (2) vinyl-2-chloroalkoxysilanes wherein each alkoxy group contains from 2 to 6 carbon atoms, and (3) vinylacyloxysilanes wherein each acyloxy group is saturated aliphatic and contains from 2 to 6 carbon atoms. This coating is almost invariably affected by the application to the surface of the glass of a solution of the silane material in a volatile solvent medium, particularly a mixture of water and a water-miscible organic solvent. After application of this solution to the surface of the glass, the coating is dried by heat to drive off the solvent. The dried surface gives superior bonding to polyester resins, as compared to an untreated glass surface.

The solvent medium in which the silane material used in the practice of my invention is dissolved typically consists of a mixture of from 10 to 80% by weight of water and from 90 to 20% of a water-miscible organic solvent selected from the group consisting of ethanol, isopropanol, n-propanol, and acetone.

The concentration of the silane material in the solvent mixture should be between 0.02 and 5% by weight based on the weight of the solvent mixture. Best results are obtained when the concentration of the silane material in the solvent mixture is between 0.1 and 1.5% based on the weight of the solvent mixture.

The silane materials referred to as the products of reaction of vinylchlorosilanes with saturated, aliphatic, dihydric alcohols are prepared according to the process set out in the co-pending application of Brooks and Ewart, Serial No. 255,534, filed November 8, 1951, now Patent No. 2,715,135, the disclosure of which is hereby incorporated by reference. According to this process the reactants are combined in such proportions that the ratio of alcoholic hydroxyl groups furnished by the dihydric alcohol to chlorine atoms furnished by the vinylchlorosilane in the initial reaction mixture is greater than unity. I particularly prefer to use those reaction products made from an initial reaction mixture having a ratio of alcoholic hydroxyl groups to chlorine atoms of from 1.3:1 to 2:1. The preferred vinylchlorosilane is vinyltrichlorosilane, although I can use divinyldichlorosilane or trivinylchlorosilane. The saturated aliphatic dihydric alcohol is usually ethylene glycol, propylene glycol, trimethylene glycol, diethylene glycol, triethylene glycol, dipropylene glycol, pentanediol-2,4 or 2-ethyl hexanediol-1,3.

Examples of vinyl-2-chloroalkoxysilanes which can be used in my invention includes vinyltris-(2-chloroethoxy)silane, vinyltris-(2-chloropropoxy)silane and divinyl-bis-(2-chloroethoxy)silane.

The preferred vinylacyloxysilane is vinyltriacetoxysilane. The acetoxy group can be replaced by higher saturated aliphatic acyloxy groups containing up to 6 carbon atoms.

My silane treating agents may have from 1 to 3 vinyl groups linked directly to the silicon, the remaining valences of the silicon being taken up by 2-chloro-alkoxy groups or acyloxy groups or by the residues of the dihydric alcohol in the case of the vinylchlorosilanedihydric alcohol reaction products. These treating agents have the general formula $$R_m\text{—Si—Vinyl}_n$$

where R is 2-chloroalkoxy, saturated aliphatic aliphatic acyloxy or the residue of dihydric alcohol reactant and m and n are each integers having values of from 1 to 3 and totalling 4. I prefer to use those compounds in which n has a value of 1.

In order to obtain the improved bonding of the present invention the surface of the glass must be substantially free of organic residues such as those left on the glass surface by sizing or lubricating compounds. The principal application of my invention is in the preparation of resin-reinforced, glass fiber laminates. Since lubricating compounds are commonly used in the preparation of glass fibers and of glass fabrics, it is particularly important that such fibers and fabrics be cleaned before treatment according to the process of my invention. As is well known to those familiar with glass fiber and fabric technology, organic residues on these materials can be conveniently removed by heating the fibers at high temperatures, e. g., around 750° F. The mode of treating the glass to insure that its surface shall be free from any extraneous material which would adversely affect the bonding of the resin thereto is well known to those skilled in the art and need not be described in detail.

Contrary to what might be expected, vinylalkoxysilanes and vinylallyloxysilanes may not be successfully substituted in the process of my invention although they are highly effective when admixed with the curable polyester resin in accordance with the above-mentioned application. Laminates made from glass fabric coated with the vinylalkoxysilanes and vinylallyloxysilanes show slightly higher flexural strengths than those made from uncoated glass fabrics but nowhere nearly as high flexural strengths as those obtained by the process of the present invention.

The curable resinous compositions with which the treated glass base is associated are well-known materials and comprise a polymerization catalyst which usually is an organic peroxide, and an esterification product of an alpha-ethylenic alpha, beta-dicarboxylic acid with a glycol, this esterification product being an advanced linear polyester containing unesterified carboxyl groups and having an acid number of from 5 to 100 and being dissolved in and copolymerizable with a liquid monomeric polymerizable ethylenic compound which is immiscible with water. Polyesters of this type are described in U. S. Patent 2,195,362. Examples of the liquid monomeric polymerizable ethylenic compound with which the linear polyesters of this type are mixed are, for instance, styrene, diallyl phthalate and triallyl cyanurate. Typical resinous mixes of unsaturated linear polyester and copolymerizable monomers useful in practicing my invention are described in U. S. Patent 2,255,313 and in British Patents 540,168 and 540,169. As descriptive of such mixes, the disclosure of said patents is hereby incorporated by reference. As is well known the unsaturated dicarboxylic acid may be partially replaced by another dibasic acid which may be typified by adipic acid, succinic acid, sebacic acid, phthalic acid, and tetrachlorophthalic anhydride, and which may be used in amounts up to 3 moles per mole of unsaturated dicarboxylic acid.

Any organic peroxide that functions as a free radical type polymerization initiator is operable in my invention. Examples of such peroxides are hydroperoxides, e. g., tertiarybutyl hydroperoxide, cumene hydroperoxide, paramenthane hydroperoxide, etc., peroxy esters, e. g., di-t-butyl diperoxyphthalate, t-butyl peroxyacetate, etc.; alkyl peroxides, e. g., di-t-butyl peroxide, dibenzyl peroxide, etc.; ketone peroxides, e. g., methylethyl ketone peroxide, cyclohexanone peroxide, etc.; and acyl peroxides, e. g., benzoyl peroxide, para-chlorobenzoyl, peroxide, 2,4-dichlorobenzoyl peroxide, lauroyl peroxide, etc.

The solution of the silane treating agent can be applied to the glass in any suitable manner which will yield a thin uniform coating of the treating agent upon evaporation of the solvent. In the case of solid glass, the solution can be applied by brushing, spraying or immersion. In the case of glass fiber or glass fabric, it is usually most convenient to immerse the fibrous glass or glass fabric in the solution after which it is removed, allowed to drain and dried to remove the solvent. The amount of the silane treating agent applied is extremely small, typically ranging from 1 to 10 molecular layers on the glass surface.

Probably the most important application of my invention is its use in bonding fibrous glass to cured polyester resins. Use of the invention effects a considerable increase in flexural strength of the products, and particularly greater retention of flexural strength after the products have been exposed to water.

Although I anticipate that the major application of my invention will be in the treatment of glass fibers or fabrics to be used for the reinforcement of polyester resins, I do not exclude other applications wherein it will be profitable to treat a glass surface in order to obtain better adhesion of cured polyester resins thereto. For example, a solid glass article can have its surface treated in accordance with my invention and then be associated with a curable polyester resin, as illustrated in Example 1 below.

The following examples illustrate my invention in more detail. All parts and percentages are by weight. Several different polyester resins have been used in the following examples. These are summarized as follows:

*Resin I.*—70% of a resin prepared according to the method of U. S. Patent 2,195,362, Example 1, combined with approximately 30% styrene monomer.

*Resin II.*—70% of a resin prepared according to the method of U. S. Patent 2,195,362, Example 1, combined with approximately 30% diallyl phthalate monomer.

*Resin III.*—98 parts of maleic anhydride, 65 parts of ethylene glycol, 40 parts of dicyclopentadiene were heated in a pot for 1 hour at 150° C., followed by 3 hours at 190–200° C. under an atmosphere of carbon dioxide. This alkyd had an acid number of 52. To 65 parts of the alkyd was added 35 parts of styrene.

*Resin IV.*—98 parts of maleic anhydride, 148 parts of phthalic anhydride, and 163 parts of propylene glycol were heated for 3 hours at 200° C. the final ½ hour being at reduced pressure. The alkyd had an acid number of 55. To 67 parts of the alkyd was added 33 parts of styrene.

*Resin V.*—88 parts of maleic anhydride, 148 parts of phthalic anhydride, 29 parts of tetrachlorophthalic anhydride, and 130 parts of ethylene glycol were heated about 4 hours at 220° C. The alkyd so prepared had an acid number of 40. To 70 parts of the alkyd 30 parts of styrene was added.

In the following examples, several different reaction products of silanes and diols were used. These are summarized as follows:

*Reaction Product A.*—225 parts of diethylene glycol were placed in a vessel. To this while constantly being stirred was added 150 parts of vinyltrichlorosilane. On addition of the silane, hydrogen chloride was evolved exothermically. The reaction mixture was subsequently heated to 200° C. and held at that temperature for 2–3 hours. The final product had essentially no remaining hydrolyzable chloride.

*Reaction Product B.*—380 parts of propylene glycol and 329 parts of vinyltrichlorosilane were reacted by method for Reaction Product A.

*Reaction Product C.*—166 parts of pentanediol-2,4 and 108 parts of vinyltrichlorosilane were reacted by method for Reaction Product A.

*Reaction Product D.*—93 parts of ethylene glycol and 81 parts of vinyltrichlorosilane were reacted by method for Reaction Product A.

*Reaction Product E.*—146 parts of 2 ethylhexanediol-1,3 and 54 parts of vinyltrichlorosilane were reacted by method for Reaction Product A.

*Reaction Product F.*—255 parts of diethylene glycol and 215 parts of cyclohexenyltrichlorosilane were reacted by the method for Reaction Product A.

*Reaction Product G.*—318 parts of diethylene glycol and 274 parts of amyltrichlorosilane were reacted by the method for Reaction Product A.

*Reaction Product H.*—62 parts of ethylene glycol and 157 parts of diethyldichlorosilane were reacted by method for Reaction Product A.

*Reaction Product I.*—106 parts of diethylene glycol and 185 parts of diphenyldichlorosilane were reacted by method for Reaction Product A.

Materials chemically identical with the vinylchlorosilane-diol reaction products can be prepared indirectly by first preparing vinylalkoxysilanes as intermediates and thereafter reacting the vinylalkoxysilanes with diols, in a manner which will be obvious to those skilled in the art. Similarly, since the halogen is eliminated as hydrogen halide during the reaction, chemically identical materials can be prepared by reacting vinylbromosilanes or vinyliodosilanes with diols. All of these chemically identical materials are of course contemplated as the full equivalents of the vinylchlorosilanes-dihydric alcohol reaction products referred to herein.

EXAMPLE 1

This example demonstrates the utility of my invention in conjunction with the application of a varnish containing a curable polyester resin to a glass surface.

A 2% solution of the reaction product of vinyltrichlorosilane and diethylene glycol (Reaction Product A) is made up in a solvent consisting of 33% isopropanol and 67% water. A thin film of this solution is brushed on a piece of plate glass and dried under an infra-red lamp. Thereafter, 5 grams of Resin IV, in admixture with 1.5% of an organic peroxide catalyst, is spread over the coated plate glass, and cured under an infra-red lamp. For comparison, a 5 gram portion of Resin IV, in admixture with the same proportion of the same catalyst, is spread on a section of plate glass which has not been coated with a solution of Reaction Product A, and is likewise cured under an infra-red lamp. After the cures have been completed, the resin films are broken by thermal shock.

On examination, one finds that the resin film cured over the undercoat of Reaction Product A solution, is bonded tightly to the glass; portions of resin film removed contain glass attached thereto. In contrast, the resin film which has been cured directly on the glass plate comes away from the glass cleanly.

In demonstrating the effect of my invention on glass fiber reinforced polyester compositions in the following examples, I have chosen to report flexural strengths of samples of molded flat sheet. It is well known to those experienced in the field that changes in tensile strength and compressive strength generally parallel changes obtained in flexural strength. The flexural strength data have been obtained as recommended, in Federal Spec. L-P 406a-Method 1031. The most significant improvement brought about by the methods of this invention is in retention of strength after aging in water. This treatment is generally recognized to be at least equivalent to one month standing in water at room temperature.

EXAMPLE 2

The application of my invention to the preparation of glass fabric laminates, is demonstrated in this example. The laminates were prepared with a wide range of polyester resins in order to show that improved laminates are obtained regardless of the particular polyester resin used to bond the fabric.

Heat-cleaned glass fabric was treated by coating it with a ½% solution of Reaction Product A in a mixture of 33% isopropyl alcohol and 66% water. The impregnated fabric was then dried by placing it on a hot metal plate for about one minute. The fabric was a long shaft satin weave with a 225⅓ warp, 225⅓ fill, and 57 warp ends with 54 picks. It was heat cleaned prior to being impregnated with the solution of the reaction product.

The treated fabric was used in conjunction with several polyester resins to prepare laminates. Each resin was catalyzed with 1½% benzoyl peroxide. The laminates were made to contain 12 plies of glass fabric; the total thickness of each laminate was about 0.12" and the glass content was about 64% by weight. The laminates were cured for 15 minutes at 175° F., followed by 15 minutes at 250° F.

For comparison purposes, laminates were also made with the several polyester resins, using untreated, heat cleaned glass fabric. The physical test results for all of the laminates are summarized in Table I.

The data in Table I show that regardless of the particular polyester resin chosen for the laminate construction, those laminates made using glass fibers treated with a reaction product of the present invention, in all cases, have a greater initial flexural strength and a greater flexural strength after three hours in boiling water, than those laminates containing untreated glass fabric.

I have attempted to use organohalosilanes other than vinylhalosilanes in the preparation of reaction products for my coating solutions. The reaction products formed with other organhalosilanes impart no improvement or at best only a slight improvement in bond strength when used in the treating solution.

The reaction products of diols with unsaturated organohalosilanes wherein the unsaturation is in a ring can be readily prepared. My experiments with solutions of these reaction products show that they are not nearly as effective in improving adhesion of the resin to the glass as are the solutions of the vinylhalosilane-diol reaction products. Thus, when a ½% solution of the product of the reaction of cyclohexenyltrichlorosilane and diethylene glycol (Reaction Product F), was used as the treating agent in the prepaartion of a glass fabric laminate similar to those prepared in Example 2, the initial flexural strength of the laminate was 54,000, and the flexural strength after 3 hours in boiling water was only 36,300. Resin IV was used in this laminate. The initial flexural strength of the comparable laminate of Example 2, prepared using the vinyltrichlorosilane-diethylene glycol reaction product, was 57,000; the flexural strength of this laminate after 3 hours in boiling water was 54,000.

I have also investigated the possibility of using the reaction products of alkylhalosilanes and diols and arylhalosilanes and diols in the process of this invention. As is indicated in Example 3 they are not satisfactory.

EXAMPLE 3

Samples of heat-cleaned glass fabric were treated with solutions of the reaction products of representative alkylhalosilanes and diols, and a representative arylhalosilane and a diol; laminates were prepared with the thus treated fabrics by the methods described in Example 2. Resin IV was used in these laminates. A ½% solution of the silane-diol reaction product was used in the solvent mixture indicated. For purposes of comparison the physical properties of a laminate made from glass fabric treated with a solution of the reaction product of vinyltrichlorosilane and ethylene glycol (Reaction Product D) are included.

*Table II*

| Silane | Diol | Treated With Reaction Product | Composition of Solvent | Flexural Strength | Flexural Strength After 3 Hr. Boil |
|---|---|---|---|---|---|
| Amyltrichloro silane | Diethylene Glycol | G | 50% Isopropanol, 50% water. | 41,000 | 30,100 |
| Diethyldichlorosilane | Ethylene Glycol | H | 67% Isopropanol, 33% water. | 51,600 | 30,200 |
| Diphenyldichlorosilane | Diethylene Glycol | I | 33% isopropanol, 67% water. | 43,800 | 21,300 |
| Vinyltrichlorosilane | Ethylene Glycol | D | 33% isopropanol, 67% water. | 64,300 | 49,700 |

*Table I*

| Type of Resin | Treated With Reaction Product A | Flexural Strength | Flexural Strength After 3 Hr. Boil |
|---|---|---|---|
| I | Yes | 58,600 | 44,100 |
| I | No | 58,200 | 21,000 |
| II | Yes | 55,400 | 46,000 |
| II | No | 44,600 | 21,800 |
| III | Yes | 59,600 | 56,200 |
| III | No | 51,300 | 29,000 |
| IV | Yes | 57,100 | 54,000 |
| IV | No | 46,900 | 27,300 |
| V | Yes | 56,800 | 58,100 |
| V | No | 54,200 | 32,900 |

The flexural strength data in Table II indicate that the laminates treated with the solutions of the alkylhalosilane and arylhalosilane reaction products, are quite inferior to laminates treated with the solutions of the vinylhalosilane reaction products.

As heretofore noted, the reaction products which I prefer to use in the present invention are those formed by the reaction of vinylhalosilanes with saturated aliphatic dihydric alcohols. The use of solutions containing reaction products prepared with a variety of diols falling within this class is illustrated in Example 4.

EXAMPLE 4

Heat-cleaned glass fabric similar to that used in Example 2 was impregnated with a variety of solutions, each containing the reaction product of vinyltrichlorosilane and a different diol. A 0.5% solution of the reaction product was used in each case. Laminates were prepared with these treated fabrics as in Example 2. A control laminate containing untreated glass fabric was also prepared. Resin IV was used in all of the laminates. Flexural strength data on the laminates are listed in Table III.

Table III

| Reaction Products (and diol used therein) | Solvent | | Flexural Strength | Flexural Strength After 3 Hrs. Boil |
|---|---|---|---|---|
| | pts. isopropanol | pts. water | | |
| A (diethylene glycol) | 33 | 67 | 57,100 | 54,000 |
| B (propylene glycol) | 33 | 67 | 59,900 | 56,200 |
| C (pentanediol-2,4) | 50 | 50 | 60,000 | 47,700 |
| D (ethylene glycol) | 37 | 63 | 54,300 | 49,700 |
| E (2-ethylhexane-diol-1,3) | 50 | 50 | 58,600 | 43,500 |
| None (control) | | | 46,900 | 27,300 |

The flexural strength data in Table III show that my process is operable with a wide range of diols.

Although it might be expected that the reaction products formed with saturated, aliphatic, monohydric alcohols, i. e. vinylalkoxysilanes, might be as effective in my invention as the reaction products formed with the saturated, aliphatic, dihydric alcohols, such is not generally the case. This is demonstrated in the following example.

EXAMPLE 5

Samples of heat-cleaned glass fabric similar to those used in Example 2 were treated by impregnating them with solutions containing two different vinylalkoxysilanes. The solutions consisted of a mixture of 50% isopropanol and 50% water and contained 1% of the vinylalkoxysilane. For comparison purposes a sample of the glass fabric was treated with a 1% solution of the reaction product of vinyltrichlorosilane and propylene glycol (Reaction Product B). All of the laminates were made using Resin IV, in accordance with the method described in Example 2. Flexural strength data obtained on these laminates are listed in Table IV.

Table IV

| Treating Agent | Flexural Strength | Flexural Strength After 3 Hrs. Boil |
|---|---|---|
| Vinyltriethoxysilane | 52,600 | 30,700 |
| Vinyltripropoxysilane | 56,800 | 38,900 |
| Reaction Product B | 62,500 | 64,300 |

The higher flexural strength of the laminate containing fabric treated with Reaction Product B and particularly the higher flexural strength of this laminate after it has been immersed in boiling water for three hours, illustrates why the diol reaction products are much preferred over the monohydric alcohol reaction products.

The reaction products formed by the reaction of vinyltrihalosilanes with triols or higher polyols, are not adaptable to my invention because they are insoluble gels. In order to avoid obtaining a gel, it is necessary to use large excesses of the triols or higher polyols in the preparation of the product. For example, it is necessary to use about 10 times as much glycerol as propylene glycol to obtain a liquid reaction product. I do not consider reaction products made with the triols or higher polyols to be practically useful in my invention.

As heretofore noted, according to the process of my invention the glass fabric is impregnated with a solution of the reaction product. In Example 6 representative data are given which show the effect of varying the composition of the solvent used in the impregnating solutions for the glass fabric. This example also shows that water-miscible organic solvents, e. g., methyl ethyl ketone, which I have not listed as preferred, may be successfully used in the mixture making up the solvent medium.

EXAMPLE 6

Heat-cleaned glass fabric was treated with solutions containing ½% of the reaction product of vinyltrichlorosilane and propylene glycol (Reaction Product B). Various solvents were used in preparing the solutions as shown in Table V. Laminates were prepared with the thus-treated fabric using Resin IV by the methods described in Example 2. For purposes of comparison, a laminate was prepared with untreated fabric, also. The physical data obtained from the laminates are listed in Table V.

Table V

| Composition of Solvent | Flexural Strength | Flexural Strength After 3 Hr. Boil |
|---|---|---|
| 40% isopropanol, 60% water | 58,900 | 55,900 |
| 60% acetone, 40% water | 62,200 | 59,600 |
| 47% ethanol, 53% water | 62,000 | 64,700 |
| 13% methyl ethyl ketone, 30% isopropanol, 57% water | 62,000 | 56,800 |
| 40% n-propanol, 60% water | 71,800 | 59,900 |
| 100% petroleum ether | 54,900 | 45,000 |
| 100% xylene | 55,700 | 49,200 |
| 100% ethanol | 55,400 | 49,200 |
| No treatment | 41,200 | 23,600 |

It is shown by Example 6 that it is desirable to have water in admixture with the alcohols or acetone in the solvating medium. Water cannot be used alone because the vinylhalosilane-diol reaction product is not completely soluble therein and also because, under these circumstances, the rate of hydrolysis of the vinylhalosilane-diol reaction product is undesirably rapid. It is not possible to state a definite limit to the amount of water which can be tolerated in the solvent mixture because the amount varies somewhat with the type and amount of diol reacted with the vinylhalosilane, and with the type of organic solvent used. The amount of water to be used in the co-solvent mixture will also depend upon the storage life required of the solution. In most instances, however, the preferred amount of water will be in the range 40%–70%. Amounts of water less than 40% and in fact down to about 10% can be used, but no worthwhile advantage is gained over the use of higher amounts of water. When amounts of water in excess of 70% are used in the co-solvent mixture, a true solution of the vinylhalosilane-diol reaction product is not obtained but rather a colloidal suspension. These suspensions are satisfactory if used soon after preparation, but lose their activity if kept for long periods. Satisfactory treatments have been carried out using suspensions of the reaction product of vinyltrichlorosilane and propylene glycol (Reaction Product B) in the solvent mixture consisting of 80% water and 20% isopropanol.

Solutions containing relatively low concentrations of the vinylhalosilane-diol reaction products can be used in the process of my invention. This is illustrated by the following example in which varying amounts of the reaction product of vinyltrichlorosilane and propylene glycol, are applied from solution to glass fabric.

EXAMPLE 7

Heat-cleaned glass fabric is treated with solutions of various concentrations of Reaction Product B (the reaction product of vinyltrichlorosilane and propylene glycol). For this series of experiments a solvent mixture consisting of 40% isopropanol and 60% water is used.

Laminates are prepared with the thus-treated fabric, using Resin IV and the method described in Example 2.

Table VI

| Concentration of Reaction Product B in solution | Flexural Strength | Flexural Strength After 3 Hr. Boil |
|---|---|---|
| 1.0% | 66,200 | 62,400 |
| 0.5% | 63,500 | 57,100 |
| 0.25% | 59,500 | 56,500 |
| 0.125% | 64,700 | 52,900 |
| 0.0625% | 53,700 | 42,700 |
| 0.00% | 41,200 | 23,600 |

The example illustrates that the application of a solution containing even a very small weight percentage, i. e. 0.06% of the reaction product, effects very significant improvements in the reinforcing properties of the glass fabric in polyester laminates.

In all of the preceding examples, after washing with the solution of reaction product the glass was dried by placing it on a hot metal plate for a short period. This is a very practical method of drying because only very short drying cycles are required. Alternatively, however, drying can be carried out by infra-red heating or by oven heating. It is necessary only to have the drying conditions sufficiently rigorous to remove the solvent.

Fabrics which are oven-dried generally give laminates having a slightly higher flexural strength than laminates containing fabric dried on a hot plate. Thus in a typical case a laminate prepared by the process of my invention with oven-dried fabric, had an initial flexural strength of 64,600 and after 3 hours in boiling water had a flexural strength of 59,800. A comparable laminate prepared by the process of my invention but containing fabric which was dried on a hot plate, had an initial flexural strength of 58,900, and after 3 hours in boiling water, had a flexural strength of 55,900.

It is essential to the operation of my invention that the glass surface be substantially free of organic residues. This is illustrated by Example 8.

EXAMPLE 8

Glass fabric composed of glass fibers which had been sized with a composition of starch, vegetable oil, softener, gelatin, vinyl polymer and an emulsifying agent was treated with a ½% solution of Reaction Product B (the reaction product of vinyltrichlorosilane and propylene glycol). The solvent medium was made up of 40% isopropanol and 60% water. A sample of the same glass fabric which has been heat cleaned was also treated with the ½% solution of Reaction Product B. Laminates were prepared with the treated fabrics and Resin IV as described for Example 2. Laminates were also prepared with fabrics similar to those described above but which had not been treated with Reaction Product B. The data on the laminates were as follows:

Table VII

| Fiber Surface | Treatment with Reaction Product B | Flexural Strength | Flexural Strength After 3 Hr. Boil |
|---|---|---|---|
| Sized | No | 35,500 | 26,200 |
| Do | Yes | 34,400 | 27,400 |
| Heat Cleaned | No | 47,600 | 26,700 |
| Do | Yes | 58,600 | 56,700 |

The data in Table VII show that laminates made from the fabric which has not been heat cleaned, are hardly affected by the process of my invention, whereas the laminates made from heat cleaned fabric are substantially improved by the process of my invention.

EXAMPLE 9

This example illustrates the use of vinyl-2-chloro-alkoxysilanes and vinyltriacetoxysilane in my invention.

The solvent for the silanes was a mixture of 50 parts isopropanol and 50 parts water. A 1% solution of the vinyltri(2-chloroalkoxy)silane and a 0.5% solution of the vinyltriacetoxysilane was used to treat the fabric.

Laminates were prepared from heat-cleaned glass fabric in the same manner as shown in Example 2. Resin IV was used and 1.5% benzoyl peroxide was employed as the curing catalyst. The resin-impregnated laminates were cured by placing the uncured laminates in a press adjusted to a temperature of 100° F.; the temperature of the press was then raised to 300° F. over the course of 30 minutes and held at 300° F. for 15 more minutes. The data are summarized in the following table:

Table VIII

[Flexural strength (p. s. i.)]

| Silane | Initial | After 3 Hours in Boiling Water |
|---|---|---|
| Vinyltri(2-chloroethoxy)silane | 66,400 | 54,800 |
| Vinyltri(2-chloropropoxy)silane | 65,700 | 50,900 |
| Vinyltriacetoxysilane | 73,000 | 63,700 |
| None (control) | 52,400 | 24,600 |

The data in Table VIII show the outstanding improvement in the flexural strength of the laminates, particularly after aging, imparted by pre-treatment of the glass fabric with the silanes.

My invention is applicable to the preparation of resin-bonded, glass fibrous structures regardless of the arrangement of the glass fibers in the structures. As has been demonstrated in the preceding examples, glass fabric laminates having improved flexural strength can be made by the method of my invention. My invention may be applied equally well to improve the properties of polyester resin structures reinforced with randomly oriented, chopped glass fibers. Another type of construction that can be prepared in accordance with my invention is one in which the glass fibers are oriented in one direction. Still another instance of the utility of my invention is in the improvement of molding compositions of the type which consist primarily of polyester resins and short length glass fibers intermixed therein.

From the foregoing, those skilled in the art will appreciate that the present invention provides many advantages. The principal advantage is that a considerable improvement in the degree of adhesion of cured polyester-type resins to glass is obtained by pre-treating the glass surface with the silane materials disclosed herein prior to bringing it into contact with the polyester resin. Numerous other advantages of my invention will be obvious to those skilled in the art.

Having thus described my invention, what I claim and desire to protect by Letters Patent is:

1. The method which comprises coating a glass base with a material selected from the group consisting of normally liquid reaction products of vinylchlorosilanes with saturated aliphatic dihydric alcohols prepared from said silanes and said alcohols in such proportions that the ratio of alcoholic hydroxyl groups furnished by said alcohols to chlorine atoms furnished by said silanes in the reaction mixture is greater than unity, vinyl-2-chloroalkoxysilanes wherein each alkoxy group contains from 2 to 6 carbon atoms, and vinylacyloxysilanes wherein each acyloxy group is aliphatic and contains from 2 to 6 carbon atoms, forming an assembly by contacting the thus-coated base with a curable polyester resin comprising a polymerization catalyst, an esterification product of an alpha-ethylenic, alpha, beta-dicarboxylic acid with a glycol, said product being an advanced linear polyester containing unesterified carboxyl groups and having an acid number of from 5 to 100 and being miscible with and copolymerizable with the liquid monomeric unsaturated polymerizable compound containing an ethylenic linkage hereinafter mentioned to yield a solid resinous material, and a liquid monomeric unsaturated compound containing an ethylenic linkage, and curing said polyester resin by heating the resulting assembly.

2. The method of claim 1 wherein said material is applied to the glass base in the form of an admixture with a mixture of water and a water-miscible organic solvent selected from the group consisting of ethanol, isopropanol, n-propanol and acetone, which solvent is volatilized from the surface of the glass base after application of the mixture to said glass base and prior to association of said treated glass base with said polyester resin.

3. The method of claim 2 wherein said material is a liquid reaction product of vinyltrichlorosilane and a saturated aliphatic dihydric alcohol.

4. The method of claim 2 wherein said material is a liquid reaction product of vinyltrichlorosilane and diethylene glycol.

5. The method of claim 2 wherein said material is a liquid reaction product of vinyltrichlorosilane and propylene glycol.

6. The method of claim 2 wherein said material is vinyltri(2-chloroethoxy)silane.

7. The method of claim 2 wherein said material is vinyltri(2-chloropropoxy)silane.

8. The method of claim 2 wherein said material is vinyltriacetoxysilane.

9. The method which comprises coating a glass fabric with a material selected from the group consisting of normally liquid reaction products of vinylchlorosilanes with saturated aliphatic dihydric alcohols prepared from said silanes and said alcohols in such proportions that the ratio of alcoholic hydroxyl groups furnished by said alcohols to chlorine atoms furnished by said silanes in the reaction mixture is greater than unity, vinyl-2-chloroalkoxysilanes wherein each alkoxy group contains from 2 to 6 carbon atoms and vinylacyloxysilanes wherein each acyloxy group is aliphatic and contains from 2 to 6 carbon atoms, assembling a plurality of layers of the thus-coated glass fabric into a laminated structure having between the fabric layers a curable polyester resin comprising a polymerization catalyst, an esterification product of an alpha-ethylenic, alpha, beta-dicarboxylic acid with a glycol, said product being an advanced linear polyester containing unesterified carboxyl groups and having an acid number of from 5 to 100 and being miscible with and copolymerizable with the liquid monomeric unsaturated polymerizable compound containing an ethylenic linkage hereinafter mentioned to yield a solid resinous material, and a liquid monomeric unsaturated polymerizable compound containing an ethylenic linkage, and curing said polyester resin by heating the resulting assembly.

References Cited in the file of this patent

UNITED STATES PATENTS

| | | |
|---|---|---|
| 2,255,313 | Ellis | Sept. 9, 1941 |
| 2,441,066 | Hanford | May 4, 1948 |
| 2,505,431 | Rust et al. | Apr. 25, 1950 |
| 2,532,583 | Tyran | Dec. 5, 1950 |
| 2,563,288 | Steinman | Aug. 7, 1951 |
| 2,587,295 | Doyle et al. | Feb. 26, 1952 |
| 2,605,242 | Sowa | July 29, 1952 |
| 2,649,396 | Witt et al. | Aug. 18, 1953 |

OTHER REFERENCES

Bjorksten: Modern Plastics, vol. 29, pp. 124–188, July 1952.